United States Patent
Wang et al.

(10) Patent No.: US 7,439,291 B2
(45) Date of Patent: Oct. 21, 2008

(54) SOLVENT-RESISTANT MEMBRANES FROM SOLVENT-INERT POLYIMIDES AND POLYKETONES

(75) Inventors: Hua Wang, Clifton Park, NY (US); Anatoli Kogan, Clifton Park, NY (US); Jared Paul Ray, Parkersburg, WV (US); Gary William Yeager, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 405 days.

(21) Appl. No.: 11/226,642

(22) Filed: Sep. 14, 2005

(65) Prior Publication Data

US 2007/0060688 A1    Mar. 15, 2007

(51) Int. Cl.
    *C08K 5/136* (2006.01)
(52) U.S. Cl. ............ 524/341; 524/342; 524/343; 524/344; 524/345; 524/346; 524/348; 524/351; 524/352; 524/353
(58) Field of Classification Search ......... 524/341–348, 524/351–353
    See application file for complete search history.

(56) References Cited

U.S. PATENT DOCUMENTS

| | | | | |
|---|---|---|---|---|
| 3,917,643 A | * | 11/1975 | Takekoshi et al. | 548/462 |
| 3,925,211 A | | 12/1975 | Schumann | |
| 4,071,590 A | | 1/1978 | Strathmann | |
| 4,378,324 A | * | 3/1983 | Makino et al. | 264/41 |
| 4,755,540 A | | 7/1988 | Blakey | |
| 4,897,307 A | * | 1/1990 | Beck et al. | 428/398 |
| 4,957,817 A | | 9/1990 | Chau et al. | |
| 4,992,485 A | | 2/1991 | Koo et al. | |
| 4,997,462 A | * | 3/1991 | Nakatani et al. | 210/640 |
| 5,042,992 A | * | 8/1991 | Blinka et al. | 95/51 |
| 5,064,580 A | * | 11/1991 | Beck et al. | 264/28 |
| 5,205,968 A | * | 4/1993 | Damrow et al. | 264/28 |
| 5,227,101 A | * | 7/1993 | Mahoney et al. | 264/28 |
| 5,286,539 A | * | 2/1994 | Kusuki et al. | 96/10 |
| 5,348,607 A | * | 9/1994 | Wojnarowski et al. | 156/298 |
| 5,700,863 A | * | 12/1997 | Bloom | 524/406 |
| 5,753,008 A | * | 5/1998 | Friesen et al. | 95/45 |
| 5,997,741 A | | 12/1999 | Shimoda et al. | |
| 6,017,455 A | | 1/2000 | Shimoda et al. | |
| 2007/0056901 A1 | * | 3/2007 | Wang et al. | 210/500.39 |

FOREIGN PATENT DOCUMENTS

DE    3321860    12/1984
EP    0182506    5/1986

OTHER PUBLICATIONS

Strathmann (26 Desalination 85 (1978).

* cited by examiner

*Primary Examiner*—Peter Szekely
(74) *Attorney, Agent, or Firm*—Mary Louise Gioeni (57) ABSTRACT

A solvent-resistant polymeric membrane comprising a solvent-inert polymer having a solubility parameter greater than 18 $(J/cm^3)^{0.5}$, such as a polyketone, a polyether ketone, polyarylene ether ketone ketone, a polyimide, a polyetherimide, or a polyphenylene sulfide, is described. The solvent-resistant polymeric membrane can be prepared by methods in which solvent-inert polymers form a solution at room temperature.

37 Claims, 7 Drawing Sheets

SOLVENT-RESISTANT MEMBRANES FROM SOLVENT-INERT POLYIMIDES AND POLYKETONES

FIELD OF THE INVENTION

The invention relates generally to solvent-resistant membranes from solvent-inert polyimides and polyketones. More particularly, the invention relates to the use of minimum melting point solvent method including eutectic, peritectic, monotectic, hypoeutectic and hypereutectic systems and their variations, and phenolic solvent method in preparing the solvent-resistant membranes.

BACKGROUND

Porous separation membranes suitable as ultrafiltration membranes and supports for reverse osmosis membrane, nanofiltration, and pervaporation are generally formed by dissolving the polymer in a solvent, casting the polymer solution on a support as a thin film, and coagulating the polymer by immersion of the support and wet thin film in a coagulation bath. Attempts to prepare solvent-resistant microporous membrane from solvent-inert polyimides and polyketones have been carried out over the years. The various methods for producing a porous membrane using a phase inversion process are known in the art. See R. Kesting, *Phase-Inversion Membranes in Synthetic Polymeric Membranes-A Structural Perspective*, 237-286, John Wiley & Sons (1985).

Aromatic polyether ketones and polyimide can be suitable materials for solvent-resistant membranes due to their intrinsic solvent-inertness. Various approaches utilizing aromatic polyether ketones and polyimides are known. For example, German Pat. No. 3,321,860, European Pat. No. 182506, and U.S. Pat. Nos. 6,017,455 and 5,997,741 describe the use of concentrated sulfuric acid to dissolve polyketones. U.S. Pat. No. 4,992,485 describes the preparation of filtration membranes by dissolving polyarylene ether ether ketone ("PEEK") in an organosulfonic acid that does not sulfonate PEEK. U.S. Pat. Nos. 4,755,540 and 5,227,101 describe the melt processes of preparing porous separation membranes in which high temperature is used. U.S. Pat. No. 4,957,817 discloses the processes of preparing porous membranes using an organic polar solvent having a boiling point in a range from 141° C. to 380° C., and casting the PEEK solution at high temperature. U.S. Pat. Nos. 3,925,211 and 4,071,590, and Strathmann (26 Desalination 85 (1978)) describe the process of preparing an asymmetric membrane from a soluble film-forming prepolymer and converting it into a final membrane product that is insoluble in solvents. These membranes can be brittle and have poor-mechanical properties. Hence, there remains a need for improved solvent-resistant microporous membranes from solvent-inert polyimides and polyketones.

SUMMARY

In one aspect, the present invention relates to compositions comprising a solution of a polymer in a solvent system. The polymer has a solubility parameter greater than 18 $(J/cm^3)^{0.5}$; the solvent system includes at least one solvent having a melting point greater than about 20° C., and has a minimum melting point less than about 60° C. The polymer may be at least partially crystalline. Preferred polymers include polyketones, polyether ketones, polyarylene ether ketone ketones, polyimides, polyetherimides, and polyphenylene sulfides.

In another embodiment, the solvent system includes a phenolic solvent, particularly a halogenated one, such as 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, o-cresol, m-cresol, p-cresol, 4-methoxy-phenol, catechol, benzoquinone, 2,3-xylenol, 2,6-xylenol, resorcinol or a combination thereof.

In yet another embodiment, the solvent system comprises a first solvent and a second solvent, the first solvent being selected from 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, and combinations thereof and the second solvent being selected from o-cresol, m-cresol, p-cresol, 4-methoxy-phenol, catechol, benzoquinone, 2,3-xylenol, 2,6-xylenol, resorcinol and combinations thereof, and preferably o-cresol, m-cresol, p-cresol or a combination thereof, more particularly 4-chloro-2-methyl-phenol or p-cresol, and most particularly 4-chloro-2-methyl-phenol and p-cresol.

In another embodiment, the present invention relates to a process for preparing a polymer membrane. The process includes providing a pourable solution comprising a polymer having a solubility parameter greater than 18 $(J/cm^3)^{0.5}$ and a solvent system having a minimum melting point less than about 50° C., the solvent system comprising at least one solvent having a melting point greater than about 20° C.; and forming a membrane from the polymer solution. In some embodiments, forming a membrane from the polymer solution comprises casting a thin film from the polymer solution, contacting the polymer solution with a coagulating bath comprising a non-solvent for the polymer, and/or removing solvents of the solvent system from the polymer solution.

In yet another embodiment, membranes prepared according to the processes of the invention may be used as ultrafiltration, microfiltration, asymmetric, hollow fiber or thin film composite membranes.

In another embodiment, the present invention relates to processes for preparing a polymer membrane wherein the process includes providing a pourable solution comprising a polymer having a solubility parameter greater than 18 $(J/cm^3)^{0.5}$ and a phenolic solvent, and forming a membrane from the polymer solution. The phenolic solvent may be 2-chlorophenol, 3-chlorophenol, 4-chlorophenol, 2-bromophenol, 2-fluoro-phenol, 3-fluoro-phenol, 2-mercapto-phenol, 3-mercapto-phenol, 2-butyl-phenol, 4-butyl-phenol, 2,4-dibromo-3-methyl-6-(1-methylethyl)phenol, 4-(1,1-dimethylpropyl)-2-methyl-phenol, 2-ethyl-phenol, or a combination thereof, preferably 2-chlorophenol.

In yet another embodiment, the present invention relates to compositions comprising a pourable solution of a polymer having a solubility parameter greater than 18 $(J/cm^3)^{0.5}$ in a phenolic solvent, the polymer comprising a polyketone, a polyimide, a polyetherimide, a polyphenylene sulfide or a combination thereof.

These and other advantages and features will be more readily understood from the following detailed description of preferred embodiments of the invention that is provided in connection with the accompanying drawings.

DETAILED DESCRIPTION OF PREFERRED EMBODIMENTS

Embodiments of the invention are related broadly to solvent-resistant polymeric membranes comprising solvent-inert polymers such as polyimides and polyketones. Such membranes may be dense or microporous, symmetric or asymmetric. Embodiments of the invention also are directed to methods of making solvent-resistant dense and microporous membranes using a minimum melting point solvent mixture (e.g. eutectic, peritectic, monotectic, hypoeutectic and hypereutectic systems and their variations) that forms a solution with the solvent-inert polymers at room temperature. Use of a minimum melting point solvent system allows one to cast microporous membranes by means of immersion precipitation with existing membrane casting equipment.

Embodiments of the invention also are directed to methods of making solvent-resistant microporous membranes using phenolic solvents, such as 2-chlorophenol, to dissolve the solvent-inert polymers, such as polyimides and polyketones. For example, use of a phenolic solvent also allows one to cast microporous membranes by means of immersion precipitation with conventional membrane casting equipment.

Polymers for use in the processes, compositions and membranes of the invention are preferably partially crystalline, having a crystallinity of at least about 5%. Methods for determining crystallinity are well known; differential scanning calorimetry and/or x-ray diffraction methods are commonly used. The polymers also have a solubility parameter, as described by Hoftyzer and Van Krevelen, greater than 18 $(J/cm^3)0.5$ (D.W. Van Krevelen, *Properties of Polymers* (Elsevier, Amsterdam, The Netherlands, 1990)). Polymers that are suitable for embodiments of the invention include, but are not limited to, polyketones, polyether ketones, polyarylene ether ketone ketones, polyimides, polyetherimides, and polyphenylene sulfides.

Aromatic and aliphatic polyketones display advantageous chemical and physical properties for many uses. High melting point, high glass transition temperature, low solubility and high chemical resistance make polyketones the materials of choice for separation applications under harsh environments. Accordingly, polyketones for use in embodiments of the invention include, but are not limited to, polyarylene ether ketone (PEK), polyarylene ether ether ketone (PEEK), polyarylene ether ketone ketone (PEKK). The poly(ether ketone)s are a family of polyarylenes linked through varying sequences of ether ("E") and ketone ("K") units. Ether-rich examples include, but are not limited to, PEEK (Victrex PEEK, Gatone™ PEEK, Gharda Chemicals) and PEEKK (Hostatec). Ketone-rich semicrystalline thermoplastic polymers include, but are not limited to, PEK (Amoco Kadel, FuMA-Tech) and PEKEKK (Ultrapek, BASF). Oxidative and hydrolytic stability are expected to increase with increasing proportion of ketone segments, and experimentally, PEKK (Declar, DuPont) and OXPEKK (Oxford Performance Materials) undergo lower weight loss at 400° C. under water/oxygen than either PEKEKK or PEEK. Aliphatic polyketones (Carilon, Shell Chemicals) are also suitable polymers for embodiments of the invention.

Polyimides are generally known as polymers with excellent thermal stability due to their high glass transition temperature. Depending on the monomer units, polyimides and their copolymers range from readily soluble (such as those supplied under the trade name of Matrimid from Huntsman, Sixef from Hoechst Celanese Corp, and Ultem 1000 from GE Advanced Materials), to semi-solvent resistant (such as Ultem 5000 from GE Advanced Materials), to broadly solvent-inert polymers (such as the polyimides from benzophenone-3,3',4,4'-tetracarboxylic dianhydride and 1,4-diaminobenzene and polyetherimide (PEI) made recently at GE Global Research Center from oxydiphthalic anhydride (ODPA), bisphenol-A diphthalic anhydride, meta-phenylene diamine, para-phenylene diamine monomers). As shown in Table 1, the ODPA-based PEI (batch # PDF-S2) shows broad solvent inertness with minimum swell after immersion in the common solvents for 45 days.

TABLE 1

Solvent Resistance of Polyetherimide

| Solvent | Siltem Swell % | Ultem 1000 Swell % | Ultem XH6050 Swell % | Ultem 5000 Swell % | ODPA-Based Semi-crystalline PEI Swell % |
| --- | --- | --- | --- | --- | --- |
| p-Dioxane | Dissolve | −30.84% | −13.1% | 40.61% | −0.13% |
| DMF | Dissolve | Dissolve | Dissolve | 58.38% | 1.20% |
| NMP | Dissolve | Dissolve | Dissolve | 148.55% | −0.12% |
| Acetonitrile | 13.07% | 14.70% | 9.2% | 13.87% | 0.31% |
| Mesitylene | Dissolve | 0.48% | 1.1% | 1.92% | 1.23% |
| THF | Dissolve | Dissolve | Dissolve | 44.82% | 0.77% |
| Hexane | 22.46% | 0.38% | 0.3% | 1.12% | 0.39% |
| Benzene | Dissolve | −13.53% | −3.1% | 3.57% | 0.62% |
| MEK | Dissolve | 10.21% | 7.6% | 6.05% | 0.00% |
| Cyclohexane | 34.79% | 0.11% | 0.3% | 0.70% | 0.67% |
| Isooctane | 17.94% | 0.51% | 0.6% | 0.77% | 0.76% |
| Toluene | Dissolve | 6.65% | 3.6% | 2.67% | 0.94% |
| Methanol | 5.22% | 2.29% | 1.4% | 3.51% | 0.93% |
| Acetone | 79.09% | 8.08% | 8.1% | 12.64% | 0.43% |

TABLE 1-continued

Solvent Resistance of Polyetherimide

| Solvent | Siltem Swell % | Ultem 1000 Swell % | Ultem XH6050 Swell % | Ultem 5000 Swell % | ODPA-Based Semi-crystalline PEI Swell % |
| --- | --- | --- | --- | --- | --- |
| Chloroform | Dissolve | Dissolve | Dissolve | 104.9% | 1.4% |
| Dichloroethane | Dissolve | Dissolve | Dissolve | 82.1% | 0.3% |
| Methylene chloride | Dissolve | Dissolve | Dissolve | 75.4% | 1.8% |

Polyimides and polyketones are stable to common organic solvents. In addition, polyketones such as PEEK and PEKK are also resistant to acids and bases, with the exception of strong acids in high concentrations. Thus, it is advantageous to make solvent-resistant porous membranes out of these solvent-inert polyimides and polyketones for organic separation applications. However, due to the solvent-inert nature of these polymers, common solvents, such as N,N-dimethylformamide ("DMF"), N,N-dimethylacetamide ("DMA"), N-methylpyrrolidinone ("NMP"), tetrahydrofuran ("THF"), methylene chloride, chloroform, 1,1,2-trichloroethane, are not able to dissolve these solvent-inert polymers during the process of preparation.

Figure 1:
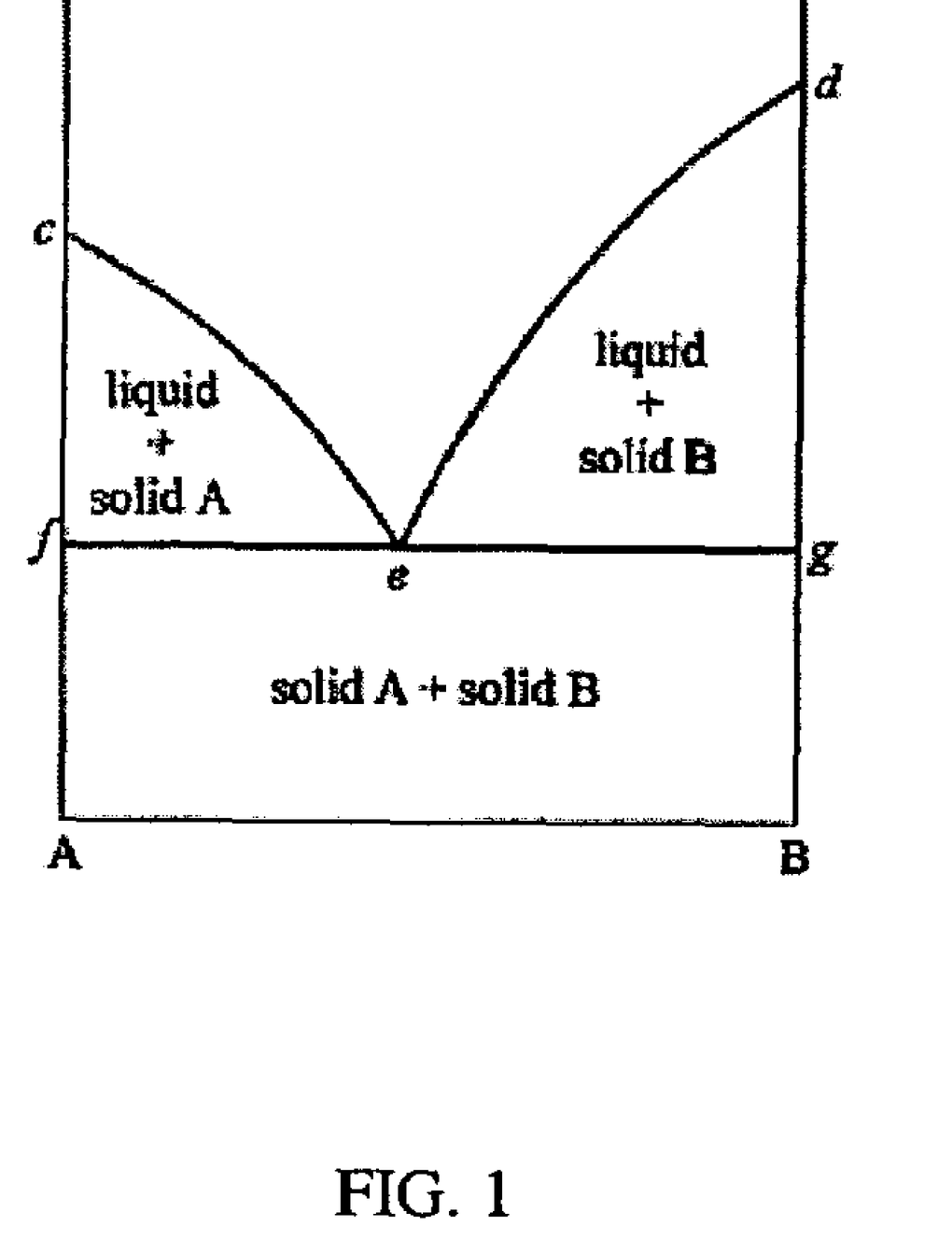
FIG. 1 illustrates the composition of a eutectic solvent mixture with respect to temperature.

In accordance with one embodiment of the invention, solvent systems or mixtures that have a minimum melting point, e.g. eutectic, peritectic, monotectic, hypoeutectic, and hypereutectic systems and their variations may be used to dissolve solvent-inert polyketones, polyetherimides and polyimides. A minimum melting point solvent system is a mixture of substances having a melting point lower than those of the individual substances. For detailed discussions on solvent mixtures that have a minimum melting point, including eutectic, peritectic, monotectic, hypereutectic and hypoeutectic systems, see Hae-Geon Lee, *Chemical Thermodynamics for Metals and Materials*, Imperial College Press (1999). FIG. 1 illustrates the phase diagram of one type of minimum melting point solvent system, a eutectic mixture, system or composition.

Suitable solvent mixture systems include: (a) a first solvent (solvent 1) that dissolves the solvent-inert polymer at an elevated temperature, and (b) a second or co-solvent (solvent 2) that forms a minimum melting point solvent mixture (e.g. eutectic, peritectic, monotectic, hypotectic and hypertectic systems and their variations) with solvent 1. The first solvent has a melting point greater than about 20° C., and is typically high boiling. Without the co-solvent, the high boiling point solvent typically forms a solid with the dissolved polymer at room temperature. With both the high boiling point solvent and the co-solvent, the mixture exhibits a melting point that is lower than that of either of its constituents. Preferably, the melting point of the minimum melting point solvent systems is near room temperature, more preferably, below room temperature. Solvent 2 by itself may or may not dissolve the solvent-inert polymers.

One embodiment of the invention is directed to a pourable composition comprising: (a) an at least partially crystalline polymer having a solubility parameter greater than 18, (b) a high boiling point solvent (solvent 1), and (c) a co-solvent (solvent 2), solvent system wherein the high boiling point solvent and the co-solvent form a solvent mixture having a melting point less than about 60° C. The composition is a pourable solution at room temperature. In the context of the present invention, 'pourable' means that the polymer solution has a viscosity less than about 100,000 cps at processing temperature, particularly less than about 10,000, and more particularly less than about 5,000 cps. Processing temperature is typically about 20-25° C., although higher or lower temperatures may also be used.

Another embodiment of the invention is directed to a process for forming solvent-resistant porous separation membranes. The process includes: (a) providing a pourable solution of a polymer in a solvent system that includes at least one solvent having a melting point greater than about 20° C., and (b) forming a membrane from the polymer solution. The solvent system has a minimum melting point less than about 60° C., and the polymer is at least partially crystalline and has a solubility parameter greater than 18 $(J/cm^3)^{0.5}$. In some embodiments, the step of forming a membrane from the polymer solution includes casting a thin film from the polymer solution; in other embodiments, it may include contacting the polymer solution with a coagulating bath comprising a non-solvent for the polymer, and/or removing solvents of the solvent system from the polymer solution. Optionally, additional processing steps, such as crosslinking, and/or washing, can be included.

The minimum melting point solvent system can be used to phase-invert other solvent-inert polymers (e.g. polyphenylene sulfide, PPS) that otherwise need a high temperature thermally-induced phase separation (TIPS) process by adding a co-solvent into the high-boiling solvent/polymer mixture to form a solution having a minimum melting point. The minimum melting point solvent method may allow for reduced processing temperature.

The high boiling point solvent (solvent 1) of the minimum melting point solvent system can be selected from solvents including, but not limited to, halo-substituted phenols and polyhalo-substituted phenols such as chlorophenols, chlorophenol salts, and their derivatives, including 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, and 2-chloro-phenol.

The co-solvent (solvent 2) of the minimum melting point solvent system can be selected from phenols and their derivatives, including, but not limited to, o-cresol, m-cresol, p-cresol, 4-methoxy-phenol, catechol, benzoquinone, 2,3-xylenol, 2,6-xylenol, and resorcinol.

As illustrated by Tables 2 and 3 below, a minimum melting point mixture system may contain high boiling point solvents such as p-chloro-o-cresol (m.p. 48-50° C., b.p. 231° C.) and p-chloro-m-cresol (m.p. 68° C., b.p. 235° C.), and co-solvents such as p-cresol (m.p. 34° C., b.p. 202° C.) and m-cresol (m.p. 8-10° C., and b.p. 203° C.) When the high-boiling point solvents are mixed with the co-solvents, the minimum melting point mixtures have melting points that are lower than those of the individual solvents, and may remain in liquid state at room temperature.

The minimum melting point solvent systems disclosed herein are suitable for commercial use. Minimum melting point solvent systems make possible the preparation of solvent resistant polyketones and polyimides membranes from solvent-inert polymers. The casting and the phase-inverting of the membranes can be carried out at room temperature without using strong concentrated acids. Embodiments of the process may be used with conventional membrane fabrication equipment.

In another embodiment of the invention, phenolic solvents, such as 2-chlorophenol, can be used to dissolve solvent-inert polyimides and polyketones. The use of phenolic solvents allows the preparation of solvent-resistant polyketone, polyetherimide and polyimide membranes from solvent-inert polymers by casting the membrane and phase-inverting the membranes at room temperature without using strong concentrated acids. The inverted process may also be used with conventional membrane fabrication equipment.

A process for forming an article of a solvent-inert polymer using a phenolic solvent includes: (a) providing a pourable solution including a polymer having a solubility parameter greater than 18 $(J/cm^3)^{0.5}$ and a phenolic solvent, and (b) forming a membrane from the polymer solution. The step of forming a membrane from the polymer solution includes casting a thin film from the polymer solution; in other embodiments, it may include contacting the polymer solution with a coagulating bath comprising a non-solvent for the polymer, and/or removing solvents of the solvent system from the polymer solution. The coagulation bath is a non-solvent for the polymer, but is miscible with the solvent, thereby leaching the solvent from the article. Optionally, additional processing steps, such as crosslinking, and washing, can be included.

Phenolic solvents may be used for preparation of a semipermeable microporous membrane from solvent-inert polymers. The microporous membrane may be an asymmetric structure of polyimide, polyetherimide or polyketone between membrane surfaces.

Also, minimum melting point solvents and the phenolic solvents can be used to prepare staple or filament fibers of a solvent-inert polymer, comprising the steps of (a) dissolving a solvent-inert polyimide, polyetherimide or polyketone in a phenolic solvent, (b) extruding the solution through an orifice to form a fiber, and (c) immersing the fiber in a coagulation bath.

Furthermore, methods using minimum melting point solvents and phenolic solvents can be used to prepare hollow fibers of a solvent-inert polymer. Such methods include the steps of (a) dissolving a solvent-inert polyimide or polyketone in a phenolic solvent, (b) extruding the solution through an annular shaped orifice, (c) injecting at the orifice a core fluid in the lumen of the fiber thus formed, and (d) immersing the fiber in a coagulation bath.

Phenolic solvents for use in some embodiments of the invention include chlorophenols such as 2-chlorophenol, 3-chlorophenol or 4-chlorophenol. In other embodiments, suitable solvents for this invention are low melting point phenols such as, but are not limited to, 2-bromophenol (5.6° C.), 2-fluorophenol (16.1° C.), 3-fluorophenol (13.7° C.), 2-mercaptophenol (5.5° C.), 3-mercaptophenol (16.5° C.), 2-butyl-phenol (−20° C.), 4-butyl-phenol (22° C.), 2,4-dibromo-3-methyl-6-(1-methylethyl)-phenol (3.7° C.), 4-(1,1-dimethylpropyl)-2-methyl-phenol (15° C.) and 2-ethyl-phenol (18° C.).

The processes in which these solvent-resistant membranes can be used include, but are not limited to, microfiltration, ultrafiltration, nanofiltration, reverse osmosis, piezodialysis, gas separations, pervaporation, dialysis, osmosis, liquid membranes, electrodialysis, thermo-osmosis and membrane distillation. The details of these processes including temperatures and pressures generally used are known in the art. Some specific applications with these membranes include oil refinery, such as natural gas dehydration, separation of mixtures with small boiling point differences and azeotropic mixtures. In addition, these membranes can be used for the enhancement of the aromatic content of petrochemical fuels either at the refinery or in automobiles. Furthermore, the removal of sulfur compounds, such as thiophene derivatives, from fuels can be achieved using these membranes.

Solvent-resistant membranes can be used for a broad range of applications, including treatment of municipal and industrial waste, such as electrocoat paint recovery, oily waste water treatment, textile effluent treatments, pulp and paper effluent treatment, leather and tanning effluent treatment, abattoir effluent treatment, cheese fabrication and recovery of proteins from whey, sugar refining, concentration and deacidification of fruit juices, clarification of beverages, vegetable protein processing, egg white concentration, enzyme and microorganism separation and harvesting, bioreactor process and tissue culture systems, preparation of ultrapure water, hemofiltration, concentration of latex emulsions, recovering dewaxing aids during oil dewaxing processes, heavy oil upgrading and deasphalting, treatment of lubricating oil, edible oil processing, removal of low molecular weight monomers from polymer processes, concentration of biological macromolecules, concentration of textile sizing, concentration of heat sensitive proteins for food additives, concentration of gelatin, enzyme and pharmaceutical preparations, production of ultrapure water for electronics industry, macromolecular separations (replacing the conventional change of phase methods), ultrafiltration of milk, separation and concentration of biologically active components, protein harvesting, processing of water for boilers, de-watering of feedstreams, processing high-temperature feed-streams, etc. In biotechnology, the membranes can be utilized for concentration of biomass, and separations of soluble products. Also, the membranes can be used as diatomaceous earth displacement, and non-sewage waste treatment for removing intractable particles in oily fluids, aqueous wastes that contain particulate toxics and stack gas. Furthermore, the membranes can be employed to separate solvents from pigments in paints, and thus these membranes can be used for radioactive wastewater treatment, heavy metal recovery, recovery of organic acids from salts, pH control without adding acid or base, regeneration of ion-exchange resins with improved process design, acid recovery from etching baths, $N_2$ enrichment of air, $O_2$ enrichment of air, $H_2$ and acid gas separation from hydrocarbons, helium recovery, fuel cell membranes and supported liquid membranes.

EXAMPLES

The physical properties of selected minimum melting point forming solvents and co-solvents and the selected chlorocresol/cresol minimum melting point mixtures are listed in Tables 2 and 3.

TABLE 2

Properties of selected minimum melting point forming solvents and co-solvents

| Material | Melting Point (° C.) | Boiling Point (° C.) | State at Room Temperature |
|---|---|---|---|
| 4-chloro-2-methyl-phenol (p-chloro-o-cresol) | 48-50 | 231 | Solid |
| 4-chloro-3-methyl-phenol (p-chloro-m-cresol) | 68 | 235 | Solid |
| o-cresol | 34 | 191 | Solid |
| p-cresol | 34 | 202 | Solid |
| m-cresol | 8-10 | 203 | Liquid |

TABLE 3

Physical state of Chlorocresol/cresol minimum melting point mixtures at room temperature

| p-Chloro-cresol (wt %) | p-Chloro-o-cresol/ p-Cresol | p-Chloro-o-cresol/ m-Cresol | p-Chloro-m-cresol/ p-Cresol | p-Chloro-m-c cresol/ m-Cresol |
|---|---|---|---|---|
| 10 | Liquid | Liquid | Liquid | Liquid |
| 20 | Liquid | Liquid | Liquid | Liquid |
| 30 | Liquid | Liquid | Liquid | Liquid |
| 40 | Liquid | Liquid | Liquid | Liquid |
| 50 | Liquid | Liquid | Liquid | Liquid |
| 60 | Liquid | Liquid | Solid | Solid |
| 70 | Solid | Liquid | Solid | Solid |
| 80 | Solid | Liquid | Solid | Solid |
| 90 | Solid | Solid | Solid | Solid |

Preparative Example 1

40 grams of p-cresol were added to a 100-ml three-neck flask. The flask was heated until p-cresol became a homogenous liquid. 2 grams of the ODPA-based PEI were subsequently added into the flask and the temperature was increased to 140° C. The PEI pellets remained intact after several hours at 140° C. while under vigorous stirring. No dissolution of the pellets was observed.

Preparative Example 2

Figure 2A:
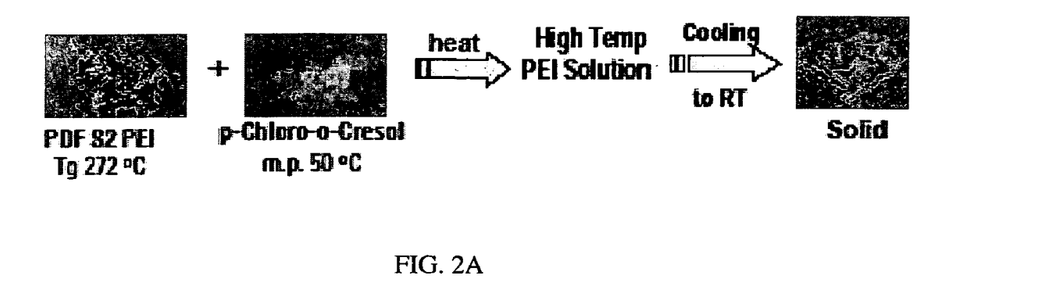
FIG. 2 illustrates the use of a eutectic solvent mixture to form a pourable solution of a solvent-resistant polymer in accordance with an embodiment of the invention.

40 grams of 4-chloro-2-methyl-phenol were added to a 100-ml three-neck flask. The flask was heated until 4-chloro-2-methyl-phenol became a homogenous liquid. The temperature was further increased to 120° C. Incremental amounts of the PEI (PDF S2) pellets were added to the flask at 1-2 grams at a time while under vigorous stirring. A homogeneous solution of 15% ODPA-based PEI in 4-chloro-2-methyl-phenol was obtained. The solution solidified upon cooling to room temperature. See FIG. 2(a).

Preparative Example 3

Figure 2B:
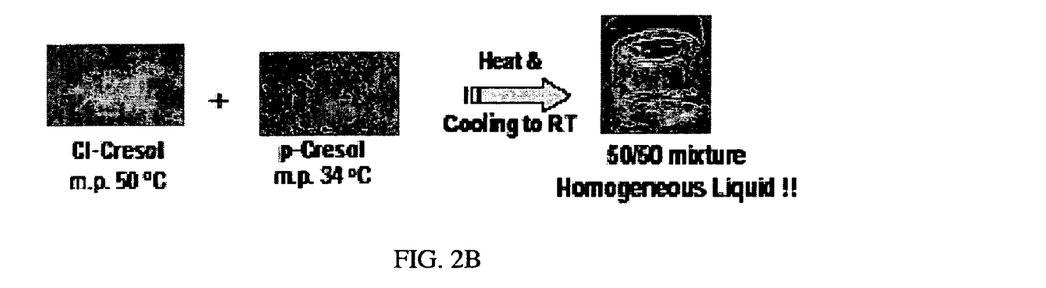

10 grams of p-cresol and 10 grams of 4-chloro-2-methyl-phenol, both exist in solid form at room temperature, were added to a jar. The jar was heated to 100° C. while under vigorous stir until a homogenous liquid was obtained. The mixture was then cooled to room temperature and was found to be a stable clear liquid. Thus p-cresol and 4-chloro-2-methyl-phenol were found to form a stable minimum melting point liquid mixture. See FIG. 2(b).

Preparative Example 4

Figure 2C:
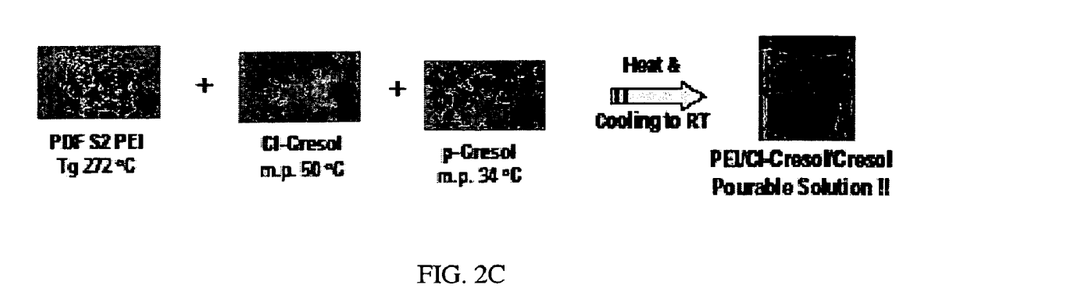

40 grams of 4-chloro-2-methyl-phenol were added to a 100-ml three-neck flask. The flask was heated until 4-chloro-2-methyl-phenol became a homogenous liquid and the temperature reached 120° C. Incremental amounts of the ODPA-based PEI pellets were added to the flask at 1-2 grams at a time while under vigorous stirring. A homogeneous solution of 15% ODPA-based PEI in 4-chloro-2-methyl-phenol was obtained. At this point, 28.9 grams of p-cresol were slowly added into the solution while the solution temperature was maintained at 120° C. Additional PEI powders were added into the flask until a solution of 15% ODPA-based PEI in the solvent mixture was obtained. The polymer solution was then cooled to room temperature and was found to be a stable pourable solution. See FIG. 2(c).

Preparative Example 5

25 grams of 4-chloro-2-methyl-phenol were added to a 100 ml three-neck flask. The flask was heated until 4-chloro-2-methyl-phenol became a homogenous liquid. The temperature was further increased to 106° C. Incremental amounts of the desired OXPEKK-SP (PEKK product obtained from Oxford Performance Materials, Inc.) pellets were added to the flask at 1-2 grams at a time while under vigorous stirring. A homogeneous solution of 15% OXPEKK-SP in 4-chloro-2-methyl-phenol was obtained. At this point, 17.1 grams of p-cresol were slowly added into the solution without significantly reducing the solution temperature. Additional PEKK pellets were added into the flask until a solution of 15% PEKK in solvent mixture was obtained. The polymer solution was then cooled to room temperature and was found to be a stable pourable solution.

Preparative Example 6

31.4 grams of 4-chloro-3-methyl-phenol were added to a 100 ml three-neck flask. The flask was heated until 4-chloro-3-methyl-phenol became a homogenous liquid. The temperature was further increased to 160° C. Incremental amounts of the desired OXPEKK-SP (PEKK product obtained from Oxford Performance Materials, Inc) pellets were added to the flask at 1-2 grams at a time while under vigorous stirring. A homogeneous solution of 26% OXPEKK-SP in 4-chloro-3-methyl-phenol was obtained. At this point, 34.5 grams p-cresol was slowly added into the solution without significantly reducing the solution temperature. A solution of 14.5% PEKK in solvent mixture was obtained. The polymer solution was then cooled to room temperature and was found to be a stable pourable solution.

Preparative Example 7

40 grams of 4-chloro-2-methyl-phenol were added to a 100-ml three-neck flask. The flask was heated until 4-chloro-2-methyl-phenol became a homogenous liquid. The temperature was further increased to 100° C. and the flask is put under nitrogen environment. Incremental amounts of the desired aliphatic PEEK (Carilon D26VM100, Shell Chemicals, obtained from Townsend Chemical, Dandenong South, Victoria, Australia) pellets were added to the flask at 1-2 grams at a time while under vigorous stir. A homogenous solution of 23.5% Carilon in 4-chloro-2-methyl-phenol was obtained. At this point, 31 grams of p-cresol were slowly added into the solution without significantly reducing the solution temperature. A solution of 15% PEEK in solvent mixture was obtained. The polymer solution was then cooled to room temperature and was found to be a pourable solution.

Preparative Example 8

46 grams of 4-chloro-2-methyl-phenol were added to a 100-ml three-neck flask. The flask was heated until 4-chloro-2-methyl-phenol became a homogenous liquid and the temperature reached 120° C. Incremental amount of the desired Ultem 5000 PEI pellets were added to the flask at 1-2 grams at a time while under vigorous stirring. A homogeneous solution of 15% Ultem 5000 PEI in 4-chloro-2-methyl-phenol was obtained. At this point, 44 grams of p-cresol were slowly added into the solution while the temperature of the solution was kept at 120° C. Additional Ultem 5000 pellets were added into the flask and dissolved in the solvent mixture until a solution of 15% Ultem 5000 PEI in the solvent mixture was obtained. The polymer solution was then cooled to room temperature and was found to be a stable pourable solution.

Examples 1-9

Figure 3:
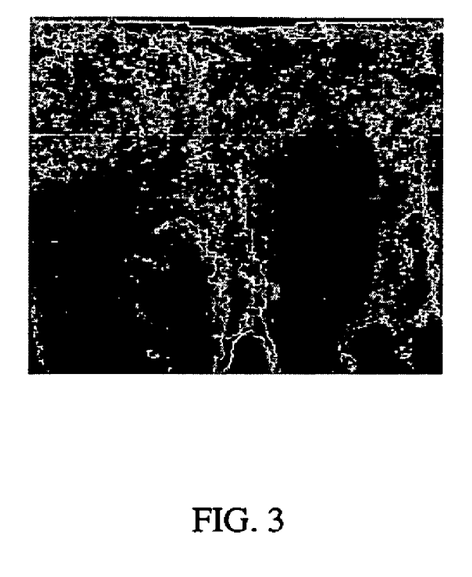
FIG. 3 is a scanning electron micrograph of ODPA-based polyetherimide membrane prepared by phase inverting in 50/50 methanol/water solvent system.

A thin wet film of the sample prepared in Preparative Example 4 was cast on a glass plate using a Meyer rod. The wet film was immediately quenched in (Example 1) methanol, (Example 2) ethanol, (Example 3) isopropanol, (Example 4) butanol, (Example 5) 40/60 methanol/water, (Example 6) 50/50 methanol/water, (Example 7) 50/50 ethanol/water, (Example 8) 50/50 isopropanol/water, and (Example 9) 50/50 butanol/water, respectively, to produce porous polyimide membranes that were then air-dried. Typical scanning electron micrograph is shown in FIG. 3.

Examples 10-12

Figure 4:
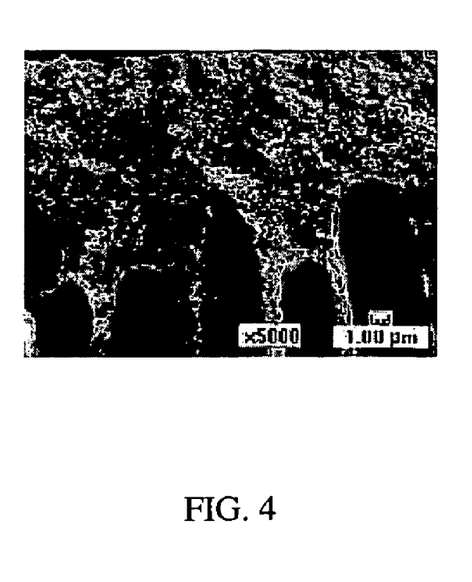
FIG. 4 is a scanning electron micrograph of Ultem 5000 membrane prepared by phase inverting in isopropanol.
Figure 5A:
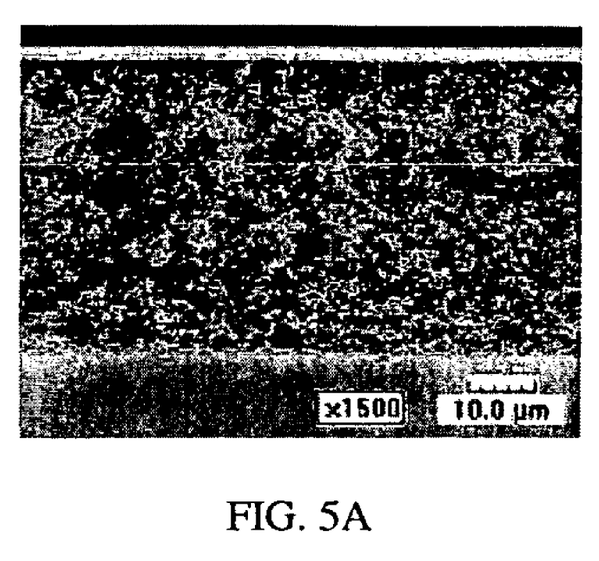
FIG. 5 shows scanning electron micrographs of OXPEKK-SP phase-inverted in (a) 50/50 ethanol/water, (b) 50/50 isopropanol/water, (c) butanol, (d) 50/50 butanol/water, (e) 30/70 methanol/water, (f) 40/60 methanol/water, (g) 50/50 methanol/water, and (h) 60/40 methanol/water.
Figure 5B:
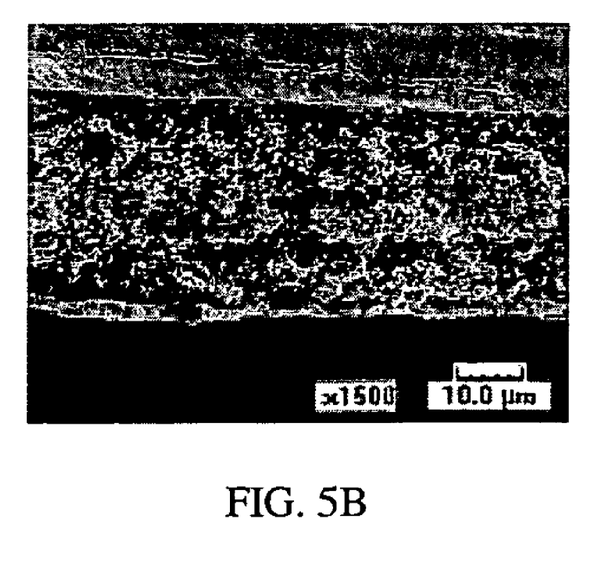
Figure 5C:
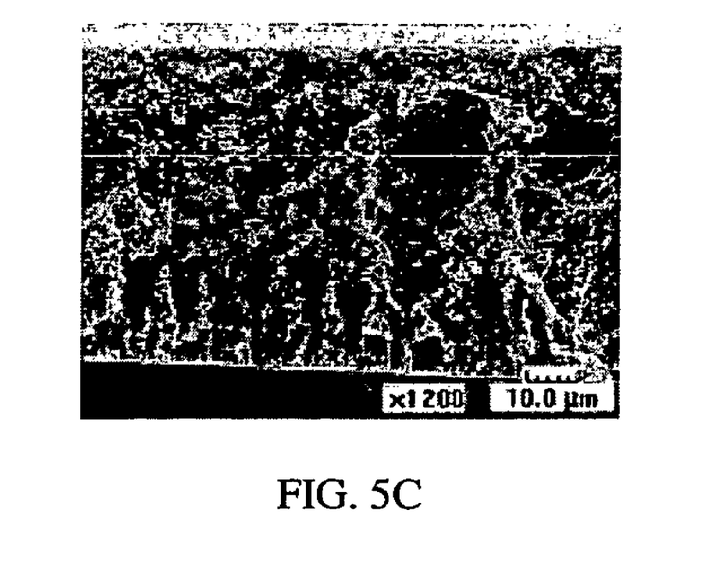
Figure 5D:
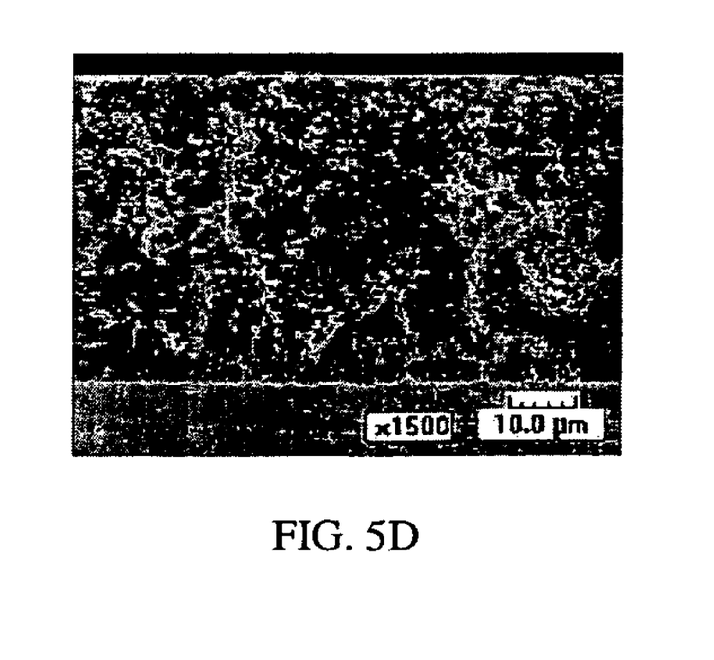
Figure 5E:
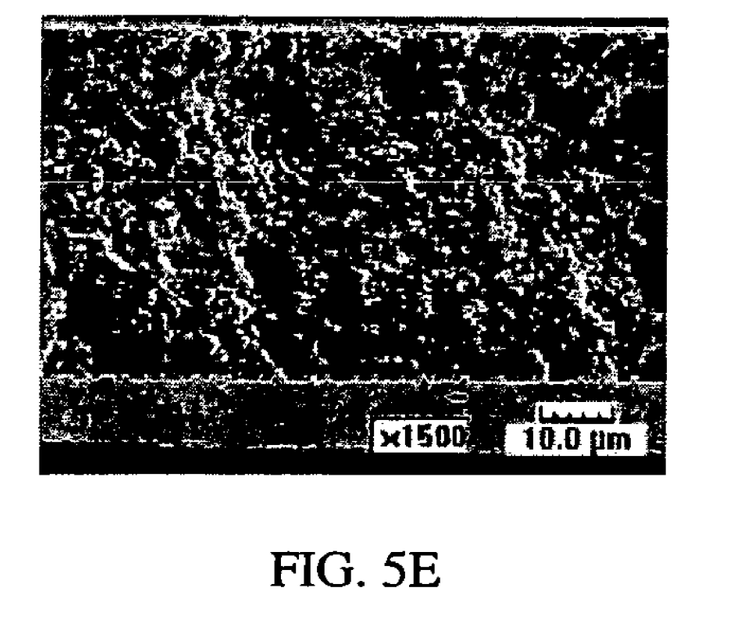
Figure 5F:
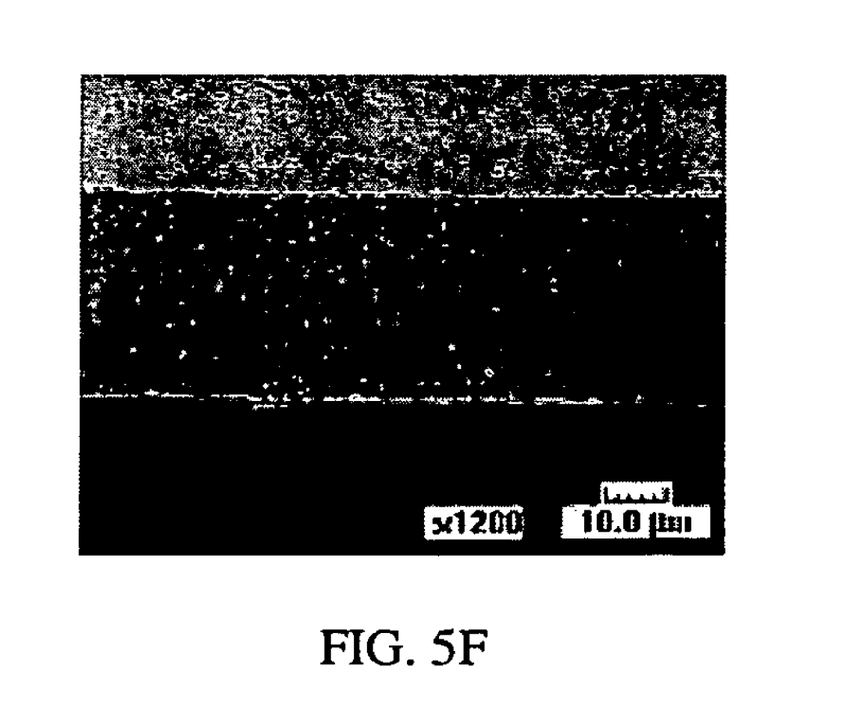
Figure 5G:
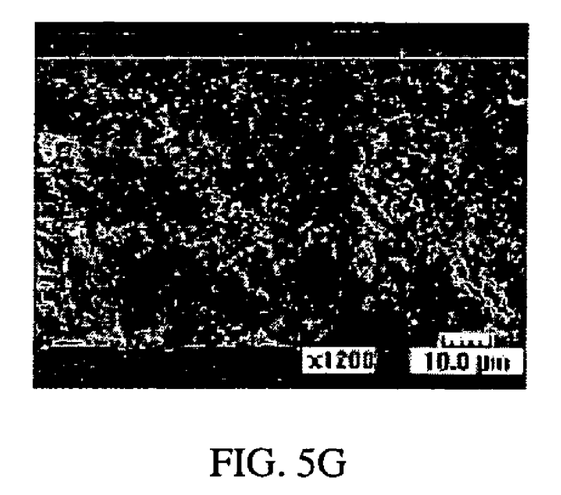
Figure 5H:
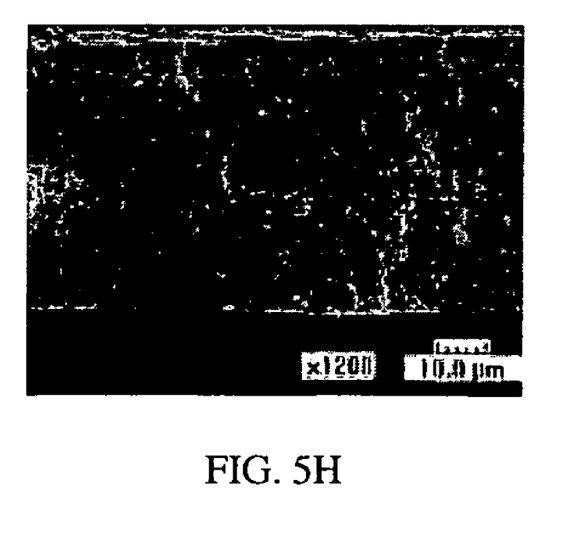

Thin wet films of the sample prepared in Preparative Example 8 were cast on a glass plate using a Meyer rod. The wet films were immediately quenched in solutions of (Example 10) methanol, (Example 11) isopropanol, and (Example 12) butanol, respectively, to produce porous Ultem 5000 membranes that were then air-dried. A typical scanning electron micrograph is shown in FIG. 4.

Examples 13-20

Thin wet films of the sample prepared in Preparative Example 5 were cast on a glass plate using a Meyer rod. The wet films were immediately quenched in solutions of (Example 13) 50/50 ethanol/water, (Example 14) 50/50 isopropanol/water, (Example 15) butanol, (Example 16) 50/50 butanol/water, (Example 17) 30/70 methanol/water, (Example 18) 40/60 methanol/water, (Example 19) 50/50 methanol/water, and (Example 20) 60/40 methanol/water. The scanning electron micrographs are shown in FIG. 5(a)-5(h).

Examples 21-24

The porous membranes prepared in Examples 5, 7, 8, and 9 were kept in the coagulation bath overnight after the phase inversion and were then soaked in (Example 21) methanol, (Example 22) ethanol, (Example 23) isopropanol and (Example 24) butanol, respectively, for 15 minutes. The membranes were then put in an oven under nitrogen for 24 hours at 150° C. After recording the weight of the dried membranes, they were soaked in DMF for 24 hours at room temperature. The membranes were then air-dried overnight and the weight of the dried membrane was measured. The weight loss before and after the DMF soak was found to be 3.0%, 3.0%, 4.0%, and 1.6%, respectively, for the membranes phase-inverted in 40/60 methanol/water, 50/50 ethanol/water, 50/50 isopropanol/water, and 50/50 butanol/water coagulation bath.

Example 25

25 grams of 2-chlorophenol were added to a 100-ml three-neck flask. The flask was heated to 90° C. Incremental amounts of the PEI (PDF S2) pellets were added to the flask at 1 gram at a time while under vigorous stirring. A homogeneous solution of 10% ODPA based PEI in 2-chlorophenol (2.5 grams of PEI dissolved in 25 grams of 2-chloro-phenol) was obtained. The homogeneous solution is stable upon cooling to room temperature.

Examples 26-33

A thin wet film of the sample prepared in Example 25 was cast on a glass plate using a Meyer rod. The wet film was immediately quenched in: (Example 26) methanol, (Example 27) ethanol, (Example 28) isopropanol, (Example 29) butanol, (Example 30) 50/50 methanol/water, (Example 31) 50/50 ethanol/water, (Example 32) 50/50 isopropanol/water, and (Example 33) 50/50 butanol/water, respectively, to produce porous polyimide membranes that were then air-dried. Scanning electron micrographs showed that these membranes showed desired porous morphology.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A composition comprising a solution of a polymer in a eutectic solvent system comprising at least two solvents having a melting point greater than about 20° C., the eutectic solvent system having a melting point less than about 20° C., and the polymer having a solubility parameter greater than 18 $(J/cm^3)^{0.5}$.

2. A composition according to claim 1, wherein the polymer is at least partially crystalline.

3. A composition according to claim 1, wherein the polymer comprises a polyketone, a polyether ketone, polyarylene ether ketone ketone, a polyimide, a polyetherimide, or a polyphenylene sulfide.

4. A composition according to claim 3, wherein the polyketone comprises a polyarylene ether ketone ketone.

5. A composition according to claim 1, wherein the polymer comprises a polyimide.

6. A composition according to claim 5, wherein the polyimide comprises structural units derived from benzophenone-3,3',4,4'-tetracarboxylic dianhydride and at least one diamine selected from 1,4-diaminobenzene, m-phenylenediamine, p-phenylenediamine and combinations thereof.

7. A composition according to claim 1, wherein the polymer comprises a polyetherimide.

8. A composition according to claim 7, wherein the polyetherimide comprises structural units derived from at least one anhydride selected from oxydiphthalic anhydride, bisphenol-A diphthalic anhydride and combinations thereof and at least one diamine selected from 1,4-diaminobenzene, m-phenylenediamine, p-phenylenediamine and combinations thereof.

9. A composition according to claim 7, wherein the polyetherimide comprises structural units derived from oxydiphthalic anhydride, bisphenol-A diphthalic anhydride, 1,4-diaminobenzene, m-phenylenediamine and p-phenylenediamine.

10. A composition according to claim 1, wherein the solvent system comprises a phenolic solvent.

11. A composition according to claim 10, wherein the phenolic solvent is halogenated.

12. A composition according to claim 10, wherein the solvent system comprises 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, o-cresol, m-cresol, p-cresol, 4-methoxy-phenol, catechol, benzoquinone, 2,3-xylenol, 2,6-xylenol, resorcinol or a combination thereof.

13. A composition according to claim 10, wherein the solvent system comprises a first solvent and a second solvent, the first solvent being selected from 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol, and combinations thereof and the second solvent being selected from o-cresol, m-cresol, p-cresol, 4-methoxy-phenol, catechol, benzoquinone, 2,3-xylenol, 2,6-xylenol, resorcinol and combinations thereof.

14. A composition according to claim 10, wherein the solvent system comprises 4-chloro-2-methyl-phenol.

15. A composition according to claim 10, wherein the solvent system comprises o-cresol, m-cresol, p-cresol or a combination thereof.

16. A composition according to claim 10, wherein the solvent system comprises p-cresol.

17. A composition according to claim 10, wherein the solvent system comprises 4-chloro-2-methyl-phenol and p-cresol.

18. A composition according to claim 10, wherein the solvent system comprises about 50 parts by weight 4-chloro-2-methyl-phenol and about 50 parts by weight p-cresol.

19. A process for preparing a polymer membrane, said process comprising:
providing a pourable solution comprising a polymer having a solubility parameter greater than 18 $(J/cm^3)^{0.5}$ and a eutectic solvent system having a melting point less than about 20° C., the solvent system comprising at least two solvents, each having a melting point greater than about 20° C.; and
forming a membrane from the polymer solution.

20. A process according to claim 19, wherein forming a membrane from the polymer solution comprises casting a thin film from the polymer solution.

21. A process according to claim 19, wherein forming a membrane from the polymer solution comprises contacting the polymer solution with a coagulating bath comprising a non-solvent for the polymer.

22. A process according to claim 19, wherein forming a membrane from the polymer solution comprises removing solvents of the solvent system from the polymer solution.

23. An ultrafiltration, microfiltration, asymmetric, hollow fiber or thin film composite membrane comprising a membrane prepared according to the process of claim 19.

24. A process according to claim 19, wherein the polymer comprises a polyketone.

25. A process according to claim 24, wherein the polyketone comprises a polyarylene ether ketone ketone.

26. A process according to claim 19, wherein the polymer comprises apolyimide.

27. A process according to claim 26, wherein the polyimide comprises structural units derived from benzophenone-3,3', 4,4'-tetracarboxylic dianhydride and at least one diamine selected from 1,4-diaminobenzene, m-phenylene diamine, p-phenylene diamine and combinations thereof.

28. A process according to claim 19, wherein the polymer comprises a polyetherimide.

29. A process according to claim 28, wherein the polyetherimide comprises structural units derived from at least one anhydride selected from oxydiphthalic anhydride, bisphenol-A diphthalic anhydride and combinations thereof and at least one diamine selected from 1,4-diaminobenzene, m-phenylene diamine, p-phenylene diamine and combinations thereof.

30. A process according to claim 19, wherein the polyetherimide comprises structural units derived from oxydiphthalic anhydride, bisphenol-A diphthalic anhydride, 1,4-diaminobenzene, m-phenylene diamine and p-phenylene diamme.

31. A process according to claim 19, wherein the solvent system comprises a solvent having a melting point greater than 20° C. and a co-solvent.

32. A process according to claim 31, wherein the solvent having a melting point greater than 20° C. is selected from the group consisting of 4-chloro-3-methyl-phenol, 4-chloro-2-methyl-phenol, 2,4-dichloro-6-methyl-phenol, 2,4-dichloro-phenol, 2,6-dichloro-phenol, 4-chloro-phenol, 2-chloro-phenol and combinations thereof.

33. A process according to claim 31, wherein the solvent having a melting point greater than 20° C. comprises 4-chloro-2-methyl-phenol.

34. A process according to claim 31, wherein the cosolvent is selected from o-cresol, m-cresol, p-cresol, 4-methoxy-phenol, catechol, benzoquinone, 2,3-xylenol, 2,6-xylenol, resorcinol and combinations thereof.

35. A process according to claim 31, wherein the cosolvent is a cresol.

36. A process according to claim 31, wherein the co-solvent is p-cresol.

37. A process according to claim 19, wherein the solvent system comprises about 50 parts by weight 4-chloro-2-methyl-phenol and about 50 parts by weight p-cresol.

* * * * *

UNITED STATES PATENT AND TRADEMARK OFFICE
CERTIFICATE OF CORRECTION

| | |
|---|---|
| PATENT NO. | : 7,439,291 B2 |
| APPLICATION NO. | : 11/226642 |
| DATED | : October 21, 2008 |
| INVENTOR(S) | : Wang et al. |

It is certified that error appears in the above-identified patent and that said Letters Patent is hereby corrected as shown below:

In Column 6, Line 54, delete "systern" and insert -- system --, therefor.

In Column 9, Line 45, delete "was heated" and insert -- was then heated --, therefor.

In Column 14, Line 20, in Claim 30, delete "diamme." and insert -- diamine. --, therefor.

Signed and Sealed this

Twentieth Day of January, 2009

JON W. DUDAS
*Director of the United States Patent and Trademark Office*